Feb. 10, 1925.                                               1,526,031
                       J. H. WEBER
              AUTOMOBILE DIRECTION INDICATOR
          Original Filed Sept. 15, 1922     3 Sheets-Sheet 1
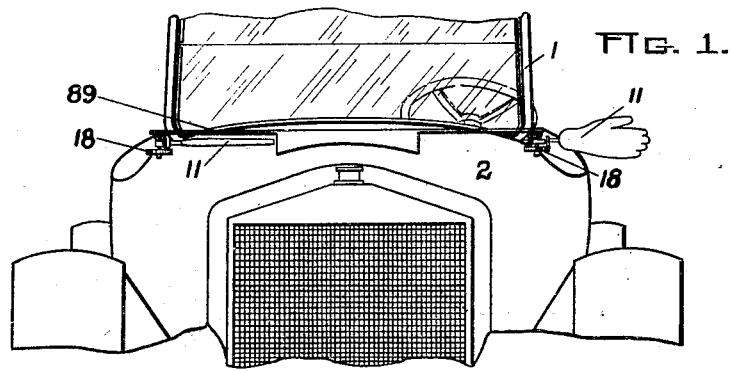
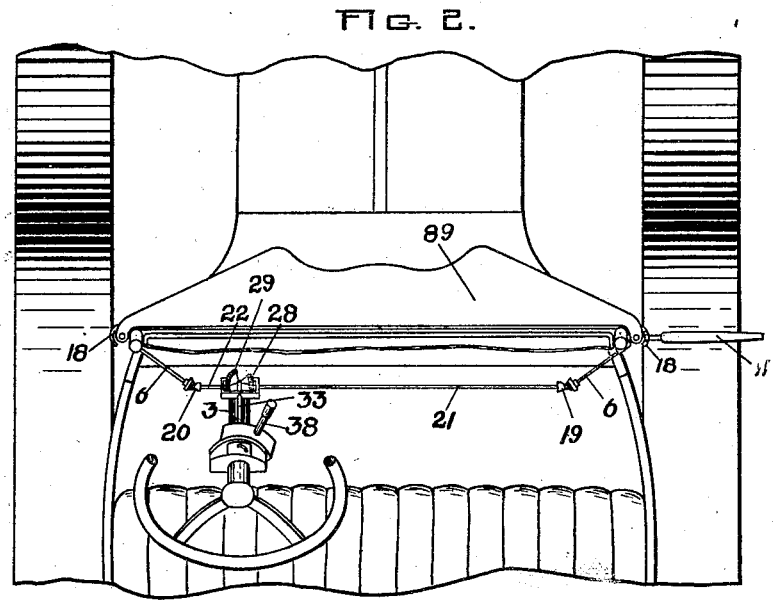
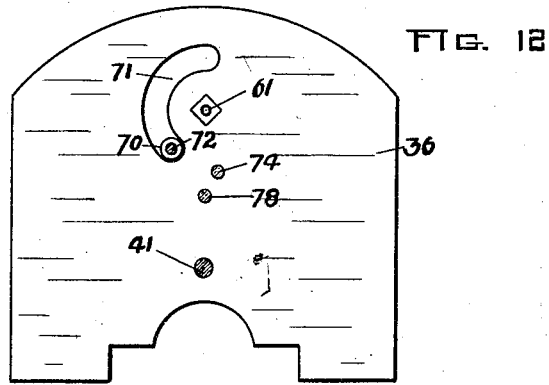
INVENTOR
J. H. WEBER Feb. 10, 1925.
J. H. WEBER
1,526,031
AUTOMOBILE DIRECTION INDICATOR
Original Filed Sept. 15, 1922   3 Sheets-Sheet 2
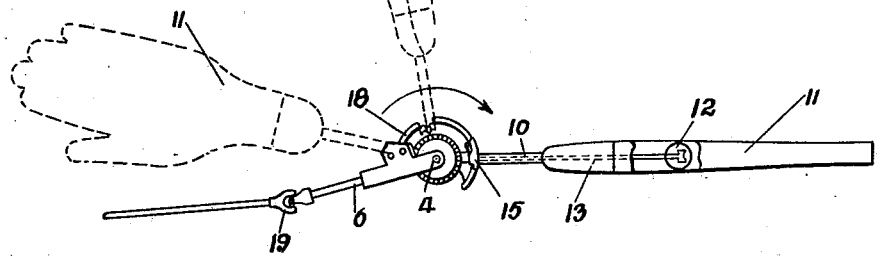
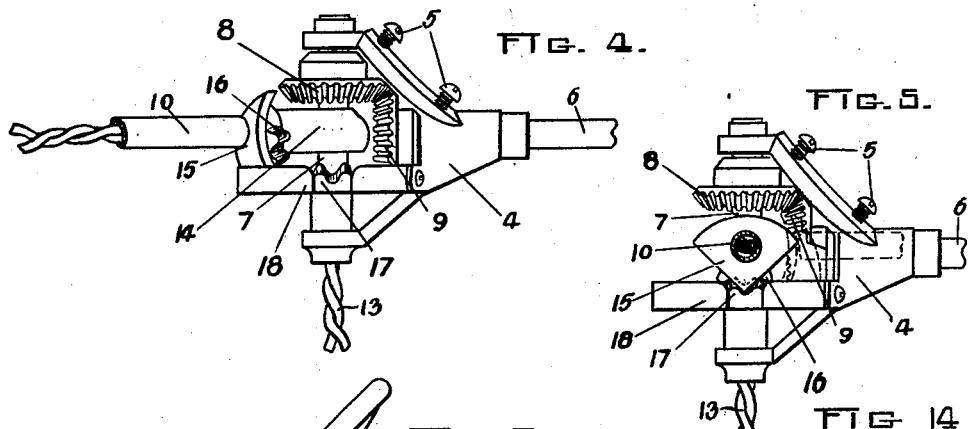
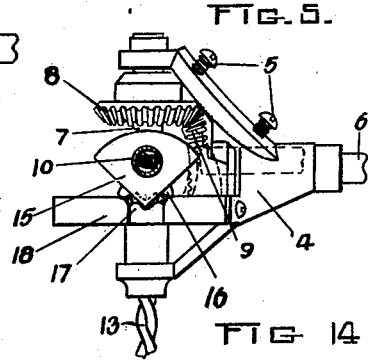
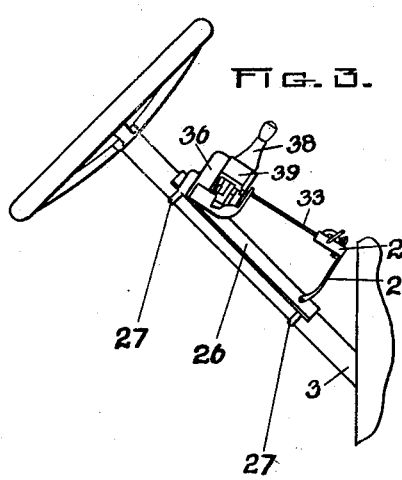
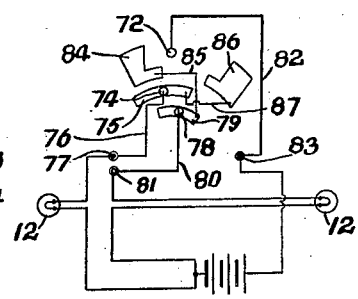
INVENTOR
J. H. WEBER
BY Arthurstonhaugh Co
Attys

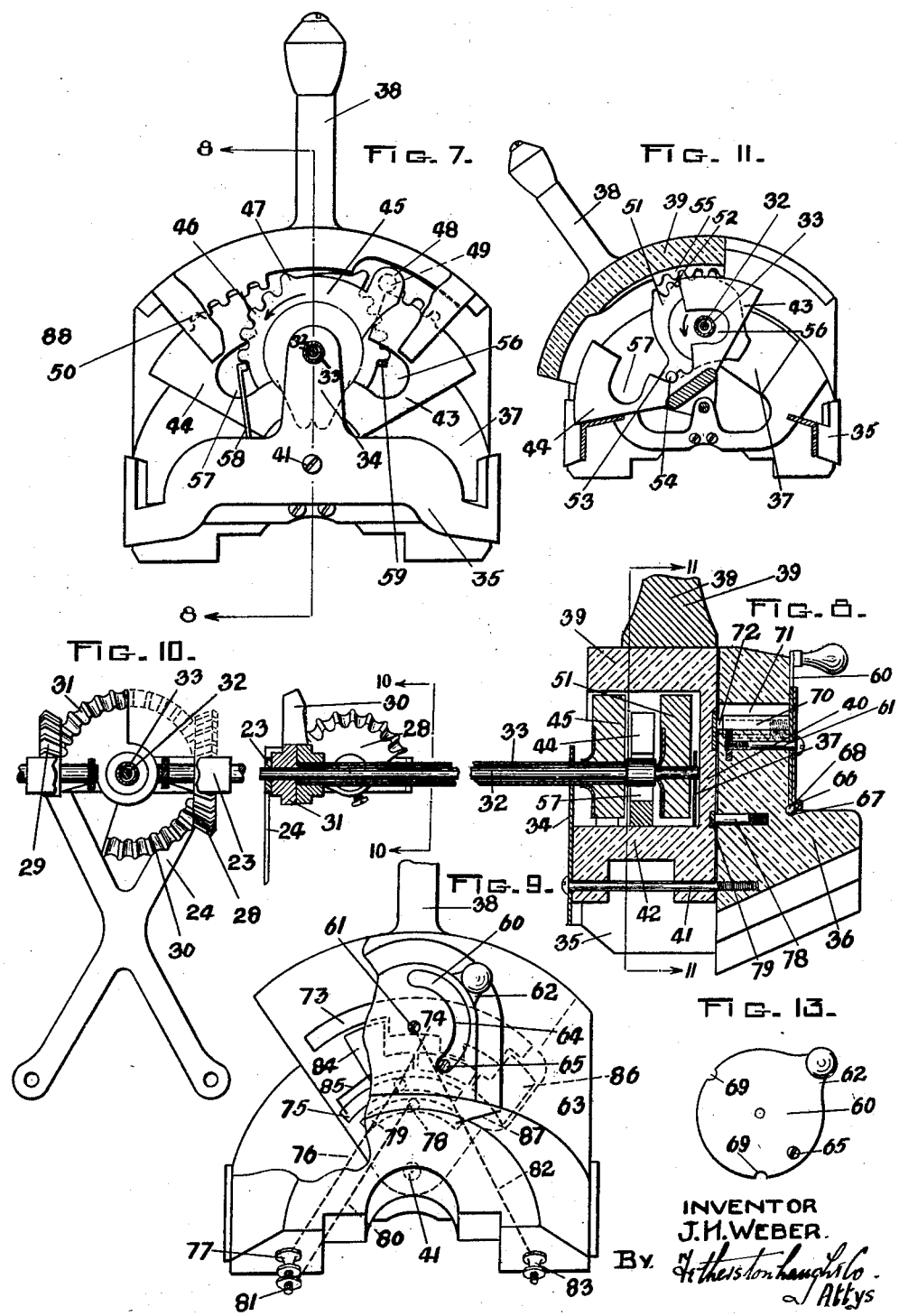

Patented Feb. 10, 1925.

1,526,031

UNITED STATES PATENT OFFICE.

JOSIAH HISTAND WEBER, OF KITCHENER, ONTARIO, CANADA.

AUTOMOBILE DIRECTION INDICATOR.

Application filed September 15, 1922, Serial No. 588,441. Renewed December 24, 1924.

*To all whom it may concern:*

Be it known that I, JOSIAH HISTAND WEBER, a subject of the King of Great Britain, and a resident of the city of Kitchener, in the county of Waterloo, in the Province of Ontario, Canada, have invented certain new and useful Improvements in Automobile Direction Indicators, of which the following is the specification.

My invention relates to improvements in automobile direction indicators and the object of the invention is to devise an indicator provided with independent operable opposed indicating signals which are controlled from a single control lever and in which each of the signals can be independently swung in a horizontal plane from the inoperative to the direction indicating position or vice versa, and wherein means is provided for partly rotating the signal into the vertical indicating position or horizontal inoperative position, depending upon which direction it is swung.

A further object is to devise means whereby either signal in being moved from the inoperative to the lateral direction indicating position or vice versa, can be controlled when rotated into the vertical position to indicate that the car to which the device is attached, is proceeding straight ahead.

A still further object is to devise means for locking either one of the signals in the inoperative position while the other signal is being operated or is in the direction indicating position, and another object is to devise means whereby both the signals in being swung in a horizontal plane are swung in front of the dash in the inoperative position whereby they are substantially concealed from view.

My invention consists of an automobile direction indicator constructed and arranged all as hereinafter more particularly described and illustrated in the accompanying drawing in which:

Fig. 1 represents a front elevation of the upper portion of a motor car showing my signals applied thereto, the left hand one being in the lateral direction indicating position and the other being in the inoperative position.

Fig. 2 is a slightly enlarged plan view of the central portion of a car showing my signals applied thereto and also illustrating the means of operating the signal from a control lever on the steering column.

Fig. 3 is a side elevation of the steering column and wheel, showing my control lever applied to the former.

Fig. 4 is a side elevation of one of the brackets upon which the direction signals are mounted, showing the arm for carrying the direction signal in the extended position.

Fig. 5 is a similar view to Figure 4 showing such arm swung into a position intermediate between the extended position and the inoperative position and also showing the means for rotating the arm to partially rotate the signal from the horizontal to the vertical position or vice versa.

Fig. 6 is a plan view of such bracket which in this case is the right hand bracket showing the indicating signal fully extended in full lines and, in dotted lines illustrating it in the position illustrated in Figure 5 and also in the inoperative position.

Fig. 7 is a front elevation of the control lever and control lever casing in which means is enclosed for actuating the operating shafts for the signals.

Fig. 8 is a vertical cross sectional view through the line 8—8 Figure 7 showing the outer signal operating shaft in section and the inner one in elevation, such shafts being broken away intermediately.

Fig. 9 is a rear elevation of the control lever casing, the back plate of which is broken away to expose the quadrant member connected to the control lever and also showing the contact plates for automatically throwing the lights in the signal into circuit upon the control lever being actuated into the required position.

Fig. 10 is a vertical cross sectional view through the line 10—10 Figure 8.

Fig. 11 is a vertical section through the line 11—11 Figure 8.

Fig. 12 is a front elevational view of the back plate showing the different brushes adapted to correspond with the respective contact plates on the segmental member illustrated in Figure 9.

Fig. 13 is an elevational detail of the switch lever and disc, and

Fig. 14 is a diagram of the signal lamp circuits.

Like characters of reference indicate corresponding parts in the different views.

1 is the windshield of the motor car. 2 is the cowl of the dash. 3 is the steering column. 4 are Y-shaped brackets for supporting the signal arms, adapted to be secured to the windshield by the screws 5, it being understood that a bracket is situated at each side of such windshield. 6 is a spindle extending laterally from the base of the Y-shaped bracket in a substantially horizontal direction and journalled therein.

7 is a vertically disposed spindle journalled in the legs of each of the Y-shaped brackets. 8 is a bevelled gear secured to such spindle 7 and adapted to mesh with the bevelled gear 9 on the outer end of the spindle 6. 10 is a signal arm extending outwardly in a substantially horizontal direction from each of the vertical spindles 7 and provided at its outer end with a suitable indicator such as the translucent hand 11 which contains the electric lamp 12, connected by means of the wires 13 which run through the arm 10, which is hollow, and down through the spindle 7, which is also hollow, and out the lower end thereof.

In mounting the arms 10 in the spindles 7 the inner ends of the arms are rotatably connected to the members 14 which are rigidly connected to the shafts 7. 15 is a signal arm rotating member suitably secured to each arm 10 in the vicinity of their inner ends, each of the members 15 being provided with the segmental toothed rack 16 which is adapted to engage the toothed rack 17 on the arc-shaped track 18 which is secured to each of the brackets 4.

The free ends of the opposed right and left hand spindles 6 are respectively connected by means of the universal joints 19 and 20 to the shafts 21 and 22, the adjacent ends of said shafts 21 and 22 journalled in the frame 23 of the bracket 24 which is suitably secured to the steering column 23 by means of a plate 26 with the clips 27. The adjacent ends of the shafts 21 and 22 are provided with sector gears 28 and 29 respectively, adapted to mesh respectively with the sector gears 30 and 31, mounted respectively on the inner shaft 32 and the outer shaft 33 extending rearwardly from the frame 23, it being understood that the shaft 33 is a hollow shaft adapted to receive the shaft 32 but functioning independently thereof, and such hollow shaft 33 is suitably journalled in the rear portion of the frame 23 whereas the inner shaft 32 is journalled at its forward end in the front portion of such frame.

The rear end of the hollow shaft 33 is journalled in the forward bracket 34 of the control lever supporting frame 35 which is in turn connected to the back plate 36 adapted to be secured to the plate 26 on the steering column, and thus support the entire control lever assembly in the position illustrated in Figures 2 and 3. The inner shaft 32 protrudes rearwardly of the outer shaft 33 and is journalled in the upwardly extending rear bracket 37 of the control lever supporting frame.

38 is the control lever having formed thereon the quadrant 39 provided with a downwardly extending plate 40 which is fulcrumed on the frame 35 by means of the pin 41.

The plate 40 has a forwardly extending boss 42 provided with laterally extending opposed sector shaped cams 43 and 44, said cams being spaced apart one from the other at their cam surfaces. The rear end of the hollow shaft 33 has mounted thereon the substantially annular member 45 provided with the segmental rack 46 terminating at its initial engaging end in a raised tooth or lug 47. 48 is a suitably positioned outwardly extending bracket on the annular member 45, on the rear face of which is journalled the roller 49 which engages with the cam face of the sector cam 43.

The lower face of the quadrant 39 is provided with the segmental rack 50 adapted to mesh with the segmental rack 46 on the annular member 45 when the control lever 38 is swung to the left. 51 is an opposed annular member mounted on the rear end of the inner shaft 32 and provided with the segmental rack 52 and also the outwardly extending bracket 53 having journalled on its forward face the rollers 54.

The segmental rack 52 is adapted to mesh with a segmental rack 55 on the underneath side of the quadrant 39, said rack 55 being positioned at the opposite end of such quadrant to the rack 50. As the boss 42 with the attached cams 43 and 44, plate 40 and quadrant 39 are pivoted about the pin 41, it is apparent that as the opposed sector cams 43 and 44 swing, they would strike the shaft 33. To obviate this, such sector cams 43 and 44 have laterally extending slots 56 and 57 extending from their adjacent faces.

58 is an upwardly extending stop secured to the frame 35 and adapted to engage the end tooth of the rack 46 on the annular member 45, when such annular member is swung in the direction indicated by the arrow in Figure 7. This stop 58 is provided to prevent the rotation of the annular member 45 when the control lever 38 is swung to the right, thus preventing any movement of the shaft 33 and the attached sector gear 31.

A forwardly extending stop 59 is provided on the bracket 37 adapted to engage the end tooth of the rack 52 on the annular member 51, thus preventing such annular member being swung upon the control lever 38 being moved to the left, and as such annular member 51 is connected to the shaft 32 it will prevent the gear 30, which is attached to the forward end thereof, moving.

The back plate 36 is provided with a disc 60 suitably pivoted on the rear face thereof by the pin 61, and having connected thereto the actuating lever 62. 63 is a plate mounted in rear of the fixed disc 60 and provided with an arc-shaped slot 64 therein, struck on a radius of which the axis of the pin 61 is the centre. 65 is a pin secured to the rear face of the disc 60 and adapted to extend through the slot 64. 66 is a trough constituted in the bottom of the plate 63 adapted to register with a slot 67 in the back plate between which the ball 68 is inserted, which is adapted to act as a stop and to enter peripheral indentations 69 in the disc, in order that there will be no danger of the disc rotating when set in either the "on" or "off" position. 70 is a forwardly extending brush receiving member secured to the disc 60 adapted to extend through the arc-shaped orifice 71 in the back plate, and provided with a spring-held brush 72 which engages the neutral plate 73 when the switch is in the "off" position. 74 is a brush, spring-held in the back plate 36 and extending forwardly into engagement with the arc-shaped contact plate 75 in the rear face of the quadrant plate 40, the neutral plate 73 also being mounted on the rear face of such quadrant plate. The lead 76 from the brush 74 extends to the terminal 77. 78 is a similar spring-held brush extending forwardly into engagement with the contact plate 79 on the rear face of the quadrant plate 40, said brush 78 being connected by means of the lead 80 with the terminal 81.

82 is a lead extending between the pivot pin 61 of the disc 60 and the terminal 83 on the back plate. 84 is a contact plate on the rear face of the quadrant plate 40 connected by the wire 85 with the contact plate 79, and 86 is a similar contact plate on the other side of the rear face of the quadrant plate 40 connected by means of the wire 87 with the contact plate 75. The forward side of the quadrant 39 is provided with a downwardly extending face plate 88 adapted to cover the rack 50 and the annular members 45.

The operation of the device is as follows.

On desiring to indicate that the vehicle is about to turn to the right it is only necessary to swing the operating lever 38 to its right hand limit. When this is done the toothed rack 55 on the quadrant 39 engages the rack 52 on the annular member 51 and as such annular member is connected to the shaft 32 such shaft will be rotated in the direction indicated by the arrow in Figure 11, thus rotating the connected sector gear 30 into the position illustrated in Figure 10. As such sector gear 30 is moved into such position it rotates the bevelled gear 28 and with it, the connected shaft 21. As such shaft 21 is connected to the spindle 6 by means of the universal joint 19, such spindle will be rotated and with it the connected bevelled gear 9 which will rotate the intermeshing bevelled gear 8 and thus rotate the shaft 7 and swing the connected arm supporting member 14 in the direction indicated by the arrow in Figure 6. As the arm 10 is free to rotate in such member 14 it will be apparent that upon the signal arm rotating member 15 reaching the position illustrated in Figure 5, the segmental gear 16 will engage the rack 17 and thus upset the arm rotating member, and as such arm rotating member is secured to the arm the hand 11 will be moved into the vertical or direction indicating position, the arm being finally swung out the full extent as indicated in full lines in Figure 6.

Upon the control lever 38 being swung back into the neutral position, the reverse operation will take place and such hand 11 will be swung back into the position illustrated in dotted lines in Figure 6 wherein when it reaches the first dotted position, the arm rotating member 15 will be upset in the reverse direction and rotate the arm into the horizontal or non-indicating position. Such arm will then be swung in under the right hand portion of the hood 89, such hood being adapted to be secured to the cowl 2 in the position illustrated in Figure 2.

When such control lever 38 is moved to the right as stated above, the roller 49 will ride on the cam face of the cam 43, thus preventing any retrograde movement of the inoperative annular member 45 which it is only desired to actuate when the lever is swung to the left. Any movement of such annular member 45 in the direction of the arrow in Figure 7, is checked by the stop 58 referred to above.

When it is desired to indicate that the vehicle is about to turn to the left the lever 38 is swung to the left when the rack 46 engages the rack 50 on the quadrant 39, thus rotating the shaft 33 in the desired direction and with it the sector gear 31 and the intermeshing gear 29 which is connected by the universal joint 20 with the spindle 6 of the other signal. The left hand signal will then on rotation of the spindle 6 be actuated in exactly the same manner as described for the right hand signal.

When the control lever 38 is moved to the left the roller 54 will ride on the cam face of the opposed cam 44, thus preventing any retrograde movement of the annular member 51, and any forward movement thereof is prevented by the stop 59 coming into contact with the end tooth of the rack 52.

In the event of it being desired to indicate that the car is proceeding straight ahead it is only necessary to swing the control lever a small extent to the right just sufficient to permit the swinging of the hand 11 into the vertical position wherein it will point dead ahead. As the hands 11 are constructed of translucent material, with the exception of the side of each hand remote from the thumb, such signals can be seen at night when lighted by the electric lamps 12 therein.

I will now describe my selective means of lighting the electric lights 12 in the respective hands when they are swung into the operative position. For instance, suppose the control lever 38 is swung to the right with the switch lever 62 in the "on" position as illustrated in Figure 9, such plate 84 will be swung into contact with the brush 72 and as such plate 84 is connected by means of the wire 85 with the plate 79 which is in contact with the brush 78 connected by a wire 80 with a terminal 81 which is in turn connected with one terminal of the right hand lamp 12, the other terminal being connected through the car battery to the terminal 83 and such terminal 83 being connected by means of the wire 82 with the brush 72, the right hand lamp circuit will be closed, thus illuminating the right hand signal.

When the switch lever 62 is in the "off" position the brush 72 will not contact with either the plate 84 or the plate 86 when the control lever 38 is moved to the right or left, and consequently the circuit will not be closed, such brush continually contacting with the neutral plate 73.

When the lever 38 is thrown to the left and the switch lever 62 is in the operative position the plate 86 will contact with the brush 72, and as the plate 86 is connected by the wire 87 with the plate 75, which is in contact with the brush 74, connected by means of the wire 76 with the terminal 77, connected to one terminal of the left hand lamp 12, the other terminal being connected through the battery with the terminal 83, which is connected by the wire 82 with the brush 72, the left hand lamp circuit will be closed.

In the event of either hands being swung into the straight-away position such plates 84 and 86 are sufficiently wide that the brush 72 will contact therewith to close the respective lamp circuits when the switch 62 is in the "on" position and thus illuminate the hands at night in such straight-away position.

The left hand signal can be used for giving warning to a car following as well as for actually indicating turning to the left in exactly the same manner as the human hand is at present used.

From the above description it will be seen that I have devised a simple and effective direction indicator in which a single control lever will operate both the signalling hands independently, and in which such hands will be swung in a horizontal plane from the inoperative to the direction indicating position or vice versa and be partly rotated into the vertical indicating position upon being swung into the operative position. Signals constructed according to my invention in addition to indicating a lateral direction, can be used to indicate that the car is proceeding straight ahead. Further I have devised means whereby the electric lamps in each signal will automatically be thrown into circuit upon the control lever being moved in the required direction, provided that the light switch has been turned on, such light switch including the selective means for controlling whichever lamp is thrown into circuit upon the corresponding actuation of the control lever.

What I claim as my invention is:

1. In an automobile direction indicator, independent direction indicating signals, each comprising a bracket suitably secured to the side of the car, a substantially horizontally journalled spindle, means for rotating the same, means for driving the vertical spindle from the hroizontal spindle, a substantially horizontally extending signal carrying arm having its inner end rotatably connected to the vertical spindle, a signal casing secured to the outer end of the signal carrying arm, and means for partially rotating the signal arm upon its being swung with the vertical spindle.

2. In an automobile direction indicator, independent direction indicating signals, each comprising a bracket suitably secured to the side of the car, a substantially horizontally journalled spindle, means for rotating the same, means for driving the vertical spindle from the horizontal spindle, a substantially horizontally extending signal carrying arm having its inner end rotatably connected to the vertical spindle, a signal casing secured to the outer end of the signal carrying arm, an arc-shaped track on the bracket having a toothed rack, an arm rotating member secured to the arm and adapted to slide on the track, and a segmental toothed rack on the arm rotating member engaged by the track rack, and the arm rotating member partially rotated upon the member and attached arm being swung.

3. In an automobile direction indicator, a plurality of independent swingable direction indicating signals, a single pivoted control lever, a tubular shaft, a shaft inside said tubular shaft and independent thereof, said shafts suitably journalled, means for connecting the shafts with the signals and with the control lever, the swinging of the control lever in one direction rotating the tubular shaft and in the reverse direction the inner shaft, and means for preventing the rotation of either shaft while the other is being rotated by the control lever.

4. In an automobile direction indicator, the combination with the rotatable spindles of the direction indicating signals, of a gear supporting frame, cross shafts journalled at their adjacent ends in the frame, gears on such adjacent ends, a suitably journalled tubular shaft, a shaft freely mounted in the tubular shaft, a sector gear on the tubular shaft, a sector gear on the inner shaft, said sector gears meshing respectively with the bevel gears, means for connecting the free ends of the cross shafts to the signal spindles and means for independently rotating the tubular and inner shaft.

5. In an automobile direction indicator, the combination with the rotatable spindles of the direction indicating signals, of a gear supporting frame, cross shafts journalled at their adjacent ends in the frame, gears on such adjacent ends, a suitably journalled tubular shaft, a shaft freely mounted in the tubular shaft, a sector gear on the tubular shaft, a sector gear on the inner shaft, said sector gears meshing respectively with the bevel gears, means for connecting the free ends of the cross shafts to the signal spindles, segmental toothed racks on the rear ends of the tubular and inner shafts, a single pivoted control lever having toothed racks adapted to mesh with the respective toothed racks.

JOSIAH HISTAND WEBER.